United States Patent [19]

Hase

[11] Patent Number: 5,191,054

[45] Date of Patent: Mar. 2, 1993

[54] NEW CROSSLINKED POLYMERS AND PROCESS FOR THEIR PRODUCTION

[75] Inventor: Brigitte Hase, Erkrath, Fed. Rep. of Germany

[73] Assignee: Henkel Kommanditgesellschaft auf Aktien, Duesseldorf-Holthausen, Fed. Rep. of Germany

[21] Appl. No.: 820,586

[22] PCT Filed: Jul. 12, 1990

[86] PCT No.: PCT/EP90/01141

§ 371 Date: Jan. 21, 1992

§ 102(e) Date: Jan. 21, 1992

[87] PCT Pub. No.: WO91/01344

PCT Pub. Date: Feb. 7, 1991

[30] Foreign Application Priority Data

Jul. 21, 1989 [DE] Fed. Rep. of Germany ....... 3924164

[51] Int. Cl.$^5$ ............................................. C08G 18/08

[52] U.S. Cl. ....................................... 528/48; 528/73; 528/368; 528/369; 528/310; 528/328

[58] Field of Search ................... 528/48, 73, 368, 369, 528/310, 328

[56] References Cited

U.S. PATENT DOCUMENTS 4,839,446 6/1989 Culbertson et al. ............... 525/504

Primary Examiner—Maurice J. Welsh
Attorney, Agent, or Firm—Ernest G. Szoke; Wayne C. Jaeschke; Norvell E. Wisdom, Jr.

[57] ABSTRACT

In this process, cyclic polyimino ethers with a $\Delta^2$-oxazoline or $\Delta^2$-5,6-dihydro-4H-1,3-oxazine structure are polymerized by heating them alone or together with cyclic monoimino ethers of the same type, or with lactones, plus cationic polymerization catalysts. The new polymers are suitable for use as raw materials, foil materials, molding materials and hot-setting adhesives.

20 Claims, No Drawings

NEW CROSSLINKED POLYMERS AND PROCESS FOR THEIR PRODUCTION

BACKGROUND OF THE INVENTION

1. Field of the Invention

This invention relates to a process for the production of crosslinked polymers from cyclic iminoethers and to the new polymers themselves.

2. Statement of Related Art

It is known that crosslinked polymers can be produced from compounds containing a cyclic iminoether group several times in the molecule. Various properties have been attributed to the polymers, depending on the type of starting materials used. Thus, according to EP 273 368, DE 20 29 524 and DE 35 39 593, they may be used as plastics, resins and adhesive compounds. However, apart from the difficulties involved in their production, the often inadequate properties of the polymers were a disadvantage in most cases.

DESCRIPTION OF THE INVENTION

It has now been found that new crosslinked polymers can be produced from new cyclic polyiminoethers.

SUMMARY OF THE INVENTION

Accordingly, the present invention relates to a process for the production of crosslinked polymers from cyclic polyiminoethers, in which a polyiminoether corresponding to formula I is polymerized with heating in the presence of acidic catalysts.

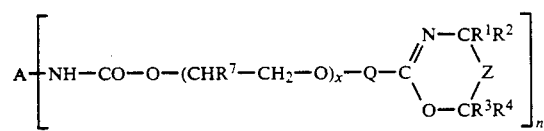

In formula I, A is an aliphatic, aromatic or araliphatic group containing 4 to 40 carbon atoms and n free valencies at various carbon atoms, x may assume a value of 0 to 40, n has a value of 2, 3 or 4, Z is either a direct bond or the group $CR^5R^6$, the substituents $R^1$ to $R^6$ independently of one another represent H, alkyl or aryl containing up to 8 carbon atoms, the substituent $R^7$ is hydrogen, methyl or ethyl and Q is a phenylene group, which may be substituted by one or two methyl groups, or the group —CHR—M—, in which R is selected from the group consisting of H, alkyl or alkenyl and M is selected from the group consisting of alkylene, alkenylene, arylene and alkarylene and the parts R and M of the molecule independently of one another contain 0 to 12 carbon atoms and may additionally be substituted by an alkoxy group containing 1 to 3 carbon atoms.

In addition to this polyiminoether (component a) and the catalyst (component c), cyclic monoiminoethers and/or lactones (component b) and typical fillers and additives (component d) may also be present during the reaction.

The present invention also relates to the crosslinked polymers obtainable by this process.

The new process enables new polymers having extremely positive properties, more particularly mechanical and electrical properties, to be obtained from readily available starting materials. Above all, the possibility of selection in the case of components a and b also enables the properties to be adapted to specific requirements. Accordingly, the new polymers are suitable for various applications, of which their use as more or less hard materials, as films, as casting compounds and as heat-curing adhesives are mentioned purely by way of example.

DESCRIPTION OF PREFERRED EMBODIMENTS

Components a to d used in the process according to the invention are described in more detail in the following.

Component a

The cyclic polyiminoethers are compounds which may be obtained in accordance with earlier patent application PCT/EP90/00733 by addition of cyclic monoiminoethers containing hydroxyl groups onto polyisocyanates. Accordingly, the disclosure of this application is included in the subject matter of the present application. Starting materials for the production of the cyclic polyiminoethers corresponding to formula I are polyisocyanates corresponding to formula II

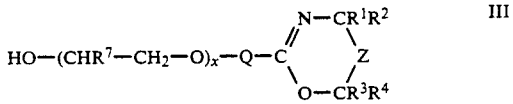

and iminoethers corresponding to formula III

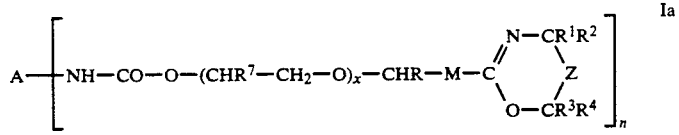

in which A, n, x, Z, $R^1$ to $R^7$ and Q are as defined above. The addition reaction is preferably carried out with stoichiometric quantities of the starting materials at elevated temperature.

Cyclic polyiminoethers corresponding to formula Ia

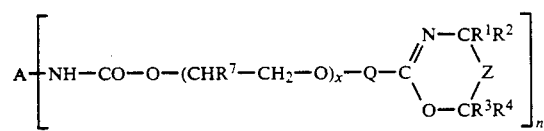

which are prepared from polyisocyanates (II) and n moles of iminoethers corresponding to formula IIIa

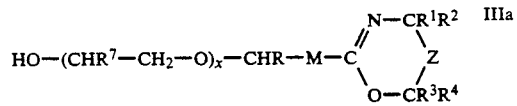

are preferred for the purposes of the present invention. In these formulae, R and M are again as defined above.

Polyiminoethers in which at least 4 of the substituents $R^1$ to $R^6$ are hydrogen atoms and the others consist of $C_{1-3}$ alkyl are also preferred. Compounds in which I is a 2-$\Delta^2$-oxazoline group, i.e. Z is a direct bond, are also preferred. Of these compounds, those having the following substitution patterns are particularly preferred:

$R^1 = CH_3$, $R^2 - R^4 = H$ $R^3 = CH_3$, $C_2H_5$ or phenyl; $R^1$, $R^2$ and $R^4 = H$ Polyiminoethers in which all the substituents $R^1$ to $R^6$ are hydrogen are most particularly preferred.

The cyclic polyiminoethers used preferably contain the group I two, three or four times and are also referred to as bis-, tris- and tetrakis-oxazolines or bis-, tris- and tetrakis-(5,6-dihydrox-4H-1,3-oxazines). Bis-iminoethers are particularly preferred.

Component b

In addition to the polyiminoethers (a), the mixtures used in accordance with the invention may contain compounds from the group of cyclic monoiminoethers, from the group of lactones or mixtures of both. Suitable monoiminoethers are $\Delta^2$-oxazolines and $\Delta^2$-oxazines substituted in the 2-position which are also referred to more exactly as 5,6-dihydro-4H-1,3-oxazines. They correspond to formula IV:

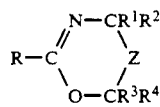

IV in which Z is a direct bond or represents the group $CR^5R^6$ and $R^1$ to $R^6$ are as defined for formula I; in the polyiminoethers (a) and the monoiminoethers (b), Z and $R^1$ to $R^6$ may of course be independently selected within the scope of the definition. R is a $C_{1-21}$ and preferably $C_{6-17}$ aliphatic, aromatic or araliphatic radical attached via carbon which may optionally contain ether groups and may bear further substituents that do not affect the polymerization reaction.

Monoiminoethers in which at least four of the substituents $R^1$ to $R^6$ are hydrogen atoms and the others consist of $C_{1-3}$ alkyl are preferred. The compounds in which Z is a direct bond are also preferred. Of these compounds, those having the following substitution patterns are particularly preferred:

$R^1 = CH_3$, $R^2 - R^4 = H$ $R^3 = CH_3$, $CH_2H_5$ or phenyl, $R^1$, $R^2$ and $R^4 = H$ Monoiminoethers in which all the substituents $R^1$ to $R^6$ are hydrogen are most particularly preferred. The monoiminoethers of formula IV suitable for the purposes of the invention are known per se and may be obtained by standard methods, mainly from monocarboxylic acids or derivatives thereof and corresponding alkanolamines or equivalent compounds by cyclizing condensation. Relevant particulars can be found in the literature (see, for example, A. Levy and M Litt, *J. Polym. Sci A*1, 6 1883 (1968); S. Kobayashi and T. Saegusa in *Ring-Opening Polymerization*, Vol. 2, Ed. K. J. Irvin, T. Saegusa, London 1984, page 761; and EP 88118090.5 and EP 90107481.5).

In addition to aromatically substituted iminoethers, such as 2-phenyl oxazoline, particular preference is attributed above all to the iminoethers obtainable from fatty acids in which R is a long-chain aliphatic radical containing 7 to 17 carbon atoms.

In addition to monoiminoethers, lactones having a 4-membered, 5-membered, 6-membered or 7-membered ring are suitable as component b. The unsubstituted compounds butyrolactone, valerolactone and caprolactone are particularly preferred, although these lactones may also be substituted, preferably by $C_{1-3}$ alkyl groups.

Ratio of a to b

The molar ratio of components a and b and the valency of component a largely determine the curing rate in the polymerization reaction. Accordingly, components a and b are preferably used in an equivalent ratio of 95:5 to 5:95 and, more particularly, 80:20 to 20:80, the equivalent weight being understood here to be the molecular weight divided by the number of iminoether groups present in the molecule (valency).

Component c

Suitable catalysts for the polymerization of components a and b are, generally, any catalysts which are capable of initiating a cationic polymerization and which are also known for the polymerization of cyclic iminoethers, for example from DE 12 06 585. The catalysts in question are generally Lewis acids or Brönsted acids or alkylating agents which are capable of forming salt-like compounds with the iminoethers and also the salt-like compounds themselves. Examples are trifluoromethanesulfonic acid methyl ester, o- and p-toluenesulfonic acid, N-methyl-2-undecyl oxazolinium trifluoromethanesulfonate and 2-phenyl oxazolinium hydroperchlorate. Since the cationic polymerization of cyclic iminoethers is a so-called living polymerization which, in principle, can always be continued at the chain ends by addition of other monomers, "living" polymers which may be prepared from component b alone are also suitable as catalysts for the process according to the invention. Liquid catalysts and catalysts which readily dissolve in the mixture of a and b at room temperature are preferred for the purposes of the present invention.

The quantity of catalyst critically determines the polymerization rate, so that the curing conditions for the mixture as a whole (time, temperature) can largely be determined in advance through the choice of the quantity used. A quantity of $5 \times 10^{-2}$ to $10^{-5}$ moles of catalyst per equivalent of components a+b is normally sufficient. Quantities above or below these limits may of course also be used where necessary.

Component d

Polymers of excellent quality are obtained from components a and c alone or from components a, b and c alone. The properties of the products can be further varied by incorporation of other auxiliaries and additives of the type typically used in the production of materials based on crosslinked (curable) polymers. Examples of such additives are dyes, pigments, light stabilizers and antiagers, fillers and modifiers. In many cases, for example in the case of dyes or light stabilizers, the desired effects can even be obtained with very small quantities of around 0.001% by weight, based on the total weight of the cured polymer (sum of a+b+c+d). In other cases, for example in the case of pigments or fillers, larger quantities beyond about 1% by weight are normally used. The upper limit to the quantity of component d is also not fixed, but is determined by the particular application and by whether the typical properties of the base polymers of a, c and optionally b in the end product are still crucial. Thus, the quantity of component d in the case of heavy fillers, such as glass fibers or even carbon fibers, may be 80% by weight and more, whereas pigments and lighter fillers are generally incorporated in quantities of no more than 60% by weight. Thermoplastic polymers, which may be incorporated in the polymer to modify its mechanical properties, are also generally used in the quantities mentioned above.

The actual polymerization process comprises heating the mixture of components a and c and, optionally, b and d until the polymerization reaction has advanced sufficiently far, preferably to completion. The mixture of starting materials a to d remains stable at room temperature for days to weeks, although the catalyst c may also be added just before the polymerization reaction. Heating is generally carried out in suitable molds after they have been filled with the liquid mixture or, alternatively, is carried out simultaneously with the filling process by reaction injection molding (RIM). In either case, it is of advantage where the polymers are used as molding compounds that they only undergo a minimal contraction in volume during curing. For other purposes, for example for the production of raw materials or films, it can be of advantage to heat the mixture of starting materials in more or less free flow in order to obtain endless polymer product, for example in the form of strands, strips or granules. The polymerization may also be carried out in suitable high-boiling solvents and, with suitable control, can lead to a fine-particle product.

The necessary temperatures and curing times may be varied within wide limits, above all through the quantity of component c, although they are also dependent on the reactivity and concentration of components a and b. Temperatures of from about 80° to 250° C. and polymerization times of from about 5 to about 120 minutes may be taken as a guide. The choice of the temperature and, hence, the time is of course also governed by the sensitivity of the substances used as component d to heat. It may be advisable in some cases to carry out the heat treatment in an inert gas atmosphere. The mixture may be heated by various methods, for example with warm air, by radiation, such as infrared or microwave radiation, or by contact heating of the molds from the rear. In practice, therefore, the choice of a suitable heating method may be entirely determined by external parameters of the process, for example by whether the process is carried out continuously or discontinuously.

At all events, new polymers are formed in the process according to the invention. Accordingly, the present invention also relates to these new polymers. The production methods for these polymers are not confined to the described process although, at present, it appears to be technically the most simple method. For example, it also appears possible that the polymers could be directly produced from corresponding quantities of polyisocyanate (II), hydroxyalkyliminoether (III), optionally monoiminoether and/or lactone (b) and components c and, optionally, d either in a single step or in two consecutive steps. Accordingly, the new polymers are included in the subject matter of the present invention, irrespective of the method used for their production.

EXAMPLES

A. Preparation of the polymers

Mixtures were prepared from various components a to d and, after introduction into silicone-coated iron molds, were heated for 30 minutes to 160° C. in a recirculating air drying cabinet. Test specimens were stamped from the 2 to 3 mm thick films formed by this polymerization process and were used to determine tensile strength in accordance with DIN 53 455. In addition, the internal transition temperatures of the crosslinked polymers were determined by dynamic-mechanical analysis.

In the case of Examples 10, 17 and 23, the polymerization was also carried out between aluminum plates (curing for 30 minutes at 160° C.) in order to be able to test the adhesive properties.

The following starting materials were used for the polymerization:

Component a

The polyiminoethers were prepared from monoiminoethers corresponding to formula IIIa and polyisocyanates corresponding to formula II in accordance with PCT/EP90/00733. In every case, they were polyoxazolines corresponding to formula Ia with $Z=0$, $R^1-R^4=H$.

TABLE 1

| | Polyiminoethers | | | |
|---|---|---|---|---|
| No. | Equivalent weight | n | Monoiminether of formula IIIa based on | Polyisocyanate of formula II |
| a1 | 448 | 2 | Ricinoleic acid | MDI (4,4'-diphenyl methane diisocyanate) |
| a2 | 434 | 2 | Ricinoleic acid | Isophorone diisocyanate |
| a3 | 482 | 3 | Ricinoleic acid | Desmodur ® N{N,N',N''-tris-(ω-isocyanatohexyl)-biuret} |
| a4 | 536 | 2 | Epoxidized erucic acid ring-opened with methanol | MDI |
| a5 | 407 | 2 | Ricinoleic acid | 1,6-Hexamethylene diisocyanate |

Component b

Unless they were commercially available (b8), the monoiminoethers were prepared in accordance with earlier patent applications EP 88 118 090.5, EP 90107480.7 and EP 90107481.5. In every case, the monoiminoethers were unsubstituted at the ring (formula IV, $R^1$ to $R^6=H$). Table 2 shows the data of the individual compounds.

TABLE 2

| | Monoiminoethers and lactones | | | |
|---|---|---|---|---|
| No. | Equivalent weight | Z | Acid base of the monoiminoether | R |
| b1 | 309 | — | Stearic acid | $C_{17}H_{35}$ |
| b2 | 309 | — | Isostearic acid | $C_{17}H_{35}$ |
| b3 | 325 | — | 12-Hydroxystearic acid | $C_{17}H_{35}O$ |
| b4 | 300 | — | Soybean oil fatty acid* | Mixture |
| b5 | 225 | — | Lauric acid | $C_{11}H_{23}$ |
| b6 | 197 | — | Capric acid | $C_9H_{19}$ |
| b7 | 169 | — | Caprylic acid | $C_7H_{15}$ |
| b8 | 99 | — | Propionic acid | $C_2H_5$ |
| b9 | 147 | — | Benzoic acid | $C_6H_5$ |
| b10 | 306 | $CH_2$ | Sunflower oil fatty acid** | Mixture |
| b11 | 114 | ε-Caprolactone | | |

*Edenor ® Sj (Henkel)
**Edenor ® Sb 05 (Henkel)

Component C

The following compounds were used as catalysts:
c1 Trifluoromethanesulfonic acid methyl ester
c2 p-Toluenesulfonic acid methyl ester
c3 o-/p-Toluenesulfonic acid methyl ester (technical, BASF)

Component d

A filler and modifier were added to the polymerization mixture in only a few cases, the following substances being used:

d1 A thermoplastic copolymer of 2-ethyl oxazoline and 2-undecyl oxazoline in a molar ratio of 10:1 (statistical), molecular weight about 12,000 (Mw, as determined by gel permeation chromatography)

d2 A surface-modified polyethylene (Primax UH 1080; Air Products and Chem. Inc.)

d3 Carbon fibers

The other conditions of the polymerization process are shown in Table 3. The quantities shown for components c and d are respectively based on the sum of the equivalents of a and b and on the quantity of component b.

B. Testing of the material properties

Tensile strength was tested in a Zwick type 1435 materials testing machine at feed rates of 10 mm/minute (Examples 1—13) and 1 mm/minute (Examples 14–19). Dumbbell-like test specimens having a width of 4.6 mm in the central part and a length of 17 mm (Examples 1–13) or bar-like test specimens 50 mm long and 5 mm wide with a free length between clamps of 20 mm (Examples 14 to 19) were used in accordance with DIN 53 455.

The transition temperatures were determined on test specimens measuring 55×10×2 mm using a DuPont Dynamic-Mechanical Analysis System. The temperatures shown in Table 4 are the maxima of the E"/T curves which were determined at a frequency of 1 c/s and at a heating rate of 5 K/minute. The measuring range extended from −120° C. to 180° C.

C. Testing of adhesive power

The test was carried out on sand-blasted aluminum plates which had been bonded with a 20×10 mm overlap (curing for 30 minutes at 160° C.). Tensile shear strength was tested in accordance with DIN 53 283. The values set out in Table 5 reflect the high strength of the bonds.

TABLE 3

| Example No. | Component a | Component b | a:b (equivalent ratio) | Component c Type | Component c Equ.-% | Component d Type | Component d Wt. % |
|---|---|---|---|---|---|---|---|
| 1 | a3 | b1 | 3:7 | c1 | 1 | — | |
| 2 | a2 | b1 | 3:7 | c1 | 1 | — | |
| 3 | a1 | b2 | 3:7 | c2 | 1 | — | |
| 4 | a1 | b4 | 3:7 | c3 | 1 | — | |
| 5 | a1 | b5 | 3:7 | c2 | 1 | — | |
| 6 | a4 | b5 | 3:7 | c2 | 1 | — | |
| 7 | a5 | b5 | 3:7 | c3 | 1 | — | |
| 8 | a1 | b6 | 3:7 | c3 | 1 | — | |
| 9 | a1 | b7 | 3:7 | c3 | 1 | — | |
| 10 | a1 | b7 | 3:7 | c1 | 1 | d1 | 30 |
| 11 | a1 | b11 | 3:7 | c3 | 2 | — | |
| 12 | a1 | b8 | 3:7 | c3 | 1 | — | |
| 13 | a1 | b10 | 3:7 | c3 | 1 | — | |
| 14 | a1 | b3 | 3:7 | c3 | 1 | — | |
| 15 | a1 | b1 | 3:7 | c1 | 1 | — | |
| 16 | a1 | — | 1:0 | c1 | 1 | — | |
| 17 | a1 | b9 | 3:7 | c1 | 1 | d1 | 30 |
| 18 | a4 | b5 | 3:7 | c2 | 1 | — | |
| 19 | a1 | b9 | 3:7 | c2 | 1 | — | |
| 20 | a1 | b6 | 3:7 | c2 | 3 | d2 | 30 |
| 21 | a1 | b2 | 3:7 | c2 | 3 | d2 | 30 |
| 22 | a1 | b6 | 3:7 | c2 | 2 | d3 | 20 |

TABLE 3-continued

| Example No. | Component a | Component b | a:b (equivalent ratio) | Component c Type | Component c Equ.-% | Component d Type | Component d Wt. % |
|---|---|---|---|---|---|---|---|
| 23 | a1 | b5 | 3:7 | c3 | 2 | d1 | 30 |

TABLE 4

| Example No. | Tensile strength N/mm² | Elongation at break % | Transition temperature K. |
|---|---|---|---|
| 1 | 11 | 35 | 229/318 |
| 2 | 7.5 | 55 | 228/321 |
| 3 | 2.5 | 100 | 230/306 |
| 4 | 1.5 | 45 | 213/303 |
| 5 | 6 | 90 | 206/314 |
| 6 | 6 | 100 | 224/311 |
| 7 | 3 | 55 | 217/288 |
| 8 | 7 | 80 | 200/320 |
| 9 | 4.5 | 75 | 207/320 |
| 10 | 8 | 80 | 211/325 |
| 11 | 1.7 | 40 | |
| 12 | 6 | 90 | 204/313 |
| 13 | 1 | 66 | 213/270 |
| 14 | | | 215/309 |
| 15 | 13 | 17 | 236/332 |
| 16 | 34 | 18 | 210/351 |
| 17 | 41 | 14 | 187/347 |
| 18 | 15 | 68 | 209/333 |
| 19 | 48 | 19 | |
| 20 | 11.6 | 220 | 202/324 |
| 21 | 4.7 | 98 | 218/310 |
| 22 | 6.9 | 43 | 217/314 |

TABLE 5

| Example | Adhesive power Tensile shear strength N/mm² |
|---|---|
| 10 | 14.8 |
| 17 | 13.9 |
| 23 | 6.3 |

What is claimed is:

1. A process for the production of crosslinked polymers from cyclic polyiminoethers, wherein a mixture of a) a cyclic polyiminoether corresponding to formula I

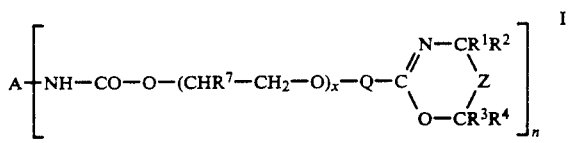

in which A is an aliphatic, aromatic or araliphatic group containing 4 to 40 carbon atoms and n free valencies at various carbon atoms, x may assume a value of 0 to 40, n has a value of 2, 3 or 4, Z is either a direct bond or the group $CR^5R^6$, the substituents $R^1$ to $R^6$ independently of one another represent H, alkyl or aryl containing up to 8 carbon atoms, the substituent $R^7$ is hydrogen, methyl or ethyl and Q is a phenylene group, which may be substituted by one or two methyl groups, or the group —CHR—M—, in which R is selected from the group consisting of H, alkyl and alkenyl and M is selected from the group consisting of alkylene, alkenylene, arylene and alkarylene and the parts R and M of the molecule independently of one another contain 0 to 12 carbon atoms and may additionally be substituted by an alkoxy group containing 1 to 3 carbon atoms, and, optionally, b) a component selected from the group consisting of cyclic monoiminoethers corresponding to formula IV

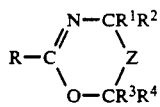

in which R is a $C_{1-21}$ aliphatic, aromatic or araliphatic radical attached by carbon which may contain ether groups and may bear further substituents and Z and also $R^1$ to $R^6$ are as defined above, lactones containing 4, 5, 6 or 7 ring members, and mixtures thereof, and, necessarily, c) a catalyst for the cationic polymerization and, optionally, d) fillers, additives, or both, is polymerized with heating.

2. A process as claimed in claim 1, in which Q in formula I is the group —CHR—M—.

3. A process as claimed in claim 2, in which components a and b are present before polymerization in a ratio of 80:20.

4. A process as claimed in claim 2, in which an ester of trifluoromethanesulfonic acid or of a toluenesulfonic acid is used as the catalyst c.

5. A crosslinked polymer of cyclic polyiminoether obtainable by a process in which a mixture of a) a cyclic polyiminoether corresponding to formula I

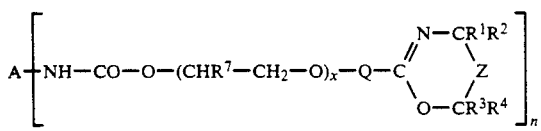

in which A is an aliphatic, aromatic or araliphatic group containing 4 to 40 carbon atoms and n free valencies at various carbon atoms, x may assume a value of 0 to 40, n has a value of 2, 3 or 4, Z is either a direct bond or the group $CR^5R^6$, the substituents $R^1$ to $R^6$ independently of one another represent H, alkyl or aryl containing up to 8 carbon atoms, the substituent $R^7$ is hydrogen, methyl or ethyl an Q is a phenylene group, which may be substituted by one or two methyl groups, or the group —CHR—M—, in which R is selected from the group consisting of H, alkyl and alkenyl and M is selected from the group consisting of alkylene, alkenylene, arylene and alkarylene and the parts R and M of the molecule independently of one another contain 0 to 12 carbon atoms and may additionally be substituted by an alkoxy group containing 1 to 3 carbon atoms, and, optionally, b) a component selected from the group consisting of cyclic monoiminoethers corresponding to formula IV

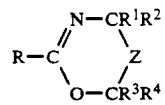

in which R is a $C_{1-21}$ aliphatic, aromatic or araliphatic radical attached by carbon which may contain ether groups and may bear further substituents and Z and also $R^1$ to $R^6$ are as defined above, lactones containing 4, 5, 6 or 7 ring members, and mixtures thereof, and, necessarily, c) a catalyst for the cationic polymerization and, optionally, d) fillers, additives, or both is polymerized with heating.

6. A polymer as claimed in claim 5, in which Q in formula I is the group —CHR—M—.

7. A polymer as claimed in claim 6, in which components a and b are present before polymerization in a ratio of 80:20 to 20:80.

8. A polymer as claimed in claim 6, in which n in formula I has the value 2.

9. A polymer as claimed in claim 6, in which Z in formula I, in formula IV, or both is a direct bond.

10. A polymer as claimed in claim 6, in which $R^1$ to $R^6$ in formula I, formula IV, or both are hydrogen atoms.

11. A process as claimed in claim 2, in which components a and b are present before polymerization in a ratio of 95:5 to 5:95.

12. A process as claimed in claim 1, in which components a and b are present before polymerization in a ratio of 95:5 to 5:95.

13. A process as claimed in claim 12, in which components a and b are present before polymerization in a ratio of 80:20 to 20:80.

14. A process as claimed in claim 1, in which an ester of trifluoromethanesulfonic acid or of a toluenesulfonic acid is used as the catalyst c.

15. A polymer as claimed in claim 6, in which components a and b are present before polymerization in a ratio of 95:5 to 5:95.

16. A polymer as claimed in claim 5, in which components a and b are present before polymerization in a ratio of 95:5 to 5:95.

17. A polymer as claimed in claim 16, in which components a and b are present before polymerization in a ratio of 95:5 to 5:95.

18. A polymer as claimed in claim 5, in which n in formula I has the value 2.

19. A polymer as claimed in claim 5, in which Z in formula I, formula IV, or both is a direct bond.

20. A polymer as claimed in claim 5, in which $R^1$ to $R^6$ in formula I, formula IV, or both are hydrogen atoms.

* * * * *